United States Patent

Okada et al.

Patent Number: 5,088,193
Date of Patent: Feb. 18, 1992

[54] METHOD FOR MANUFACTURING A HEAT EXCHANGER

[75] Inventors: Shigeru Okada, Isesaki; Nobuyasu Ando, Takasaki, both of Japan

[73] Assignee: Sanden Corporation, Gunma, Japan

[21] Appl. No.: 611,822

[22] Filed: Nov. 13, 1990

Related U.S. Application Data

[62] Division of Ser. No. 402,696, Sep. 5, 1989, abandoned.

[30] Foreign Application Priority Data

Sep. 2, 1988 [JP] Japan ............... 58-115039[U]

[51] Int. Cl.⁵ ............................................ B23P 15/26
[52] U.S. Cl. ....................... 29/890.043; 29/890.052; 29/890.054
[58] Field of Search ............ 29/890.052, 890.043, 29/890.054, 432, 530; 165/173; 228/183

[56] References Cited

U.S. PATENT DOCUMENTS

| | | |
|---|---|---|
| 3,307,622 | 3/1967 | Oddy . |
| 3,540,529 | 11/1970 | Umino et al. ............ 29/890.043 |
| 3,689,972 | 9/1972 | Mosier et al. . |
| 3,993,126 | 11/1976 | Taylor . |
| 4,234,041 | 11/1980 | Melnyk ................ 29/890.052 |
| 4,569,390 | 2/1986 | Knowlton et al. . |
| 4,615,385 | 10/1986 | Saperstein et al. . |
| 4,730,669 | 3/1988 | Beasley et al. ........... 29/890.043 |
| 4,749,033 | 6/1988 | Clausen .................. 165/173 |

FOREIGN PATENT DOCUMENTS

| | | | |
|---|---|---|---|
| 0167039 | 10/1983 | Japan ................. | 29/890.052 |
| 807608 | 1/1959 | United Kingdom ......... | 29/890.052 |
| 0944094 | 12/1963 | United Kingdom ......... | 29/890.052 |

*Primary Examiner*—Irene Cuda
*Attorney, Agent, or Firm*—Banner, Birch, McKie & Beckett

[57] ABSTRACT

A heat exchanger includes a pair of headers, a plurality of flattened oval heat exchange tubes, and a plurality of fins positioned between the headers over the length of the heat exchange tubes. The tubes are connected to the headers through a plurality of elongated holes in the header that have tapered lips. The lip taper forms an annular depression around the tube upon insertion that provides a good structural integrity. The connector holes are formed in each of the headers by a pressing method that eliminates header warping and produces dimensionally accurate hole shapes.

4 Claims, 6 Drawing Sheets

METHOD FOR MANUFACTURING A HEAT EXCHANGER

This application is a division of application Ser. No. 402,696, filed Sept. 5, 1989, abandoned.

FIELD OF THE INVENTION

The present invention relates to heat exchangers of the type provided with headers interconnected in a particular manner by a plurality of heat exchange tubes. The invention is also directed to a method for manufacturing heat exchangers.

BACKGROUND OF THE INVENTION

Many types of heat exchangers in use today employ two headers spaced apart and interconnected by a plurality of parallel, open ended tubes. A plurality of openings in the headers receive the open ends of the heat exchange tubes yet to place the headers in fluid communication. Air or some other fluid then passes over the tubes and exchanges heat energy with the fluid flowing through the tubes. Often, a plurality of plate or serpentine fins are disposed over the entire tube length between the headers to increase the surface area available for exchanging heat.

Typical applications for heat exchangers are car or truck radiators and condensers. Heat exchangers may also be found in commercial processes or as one component in a much larger system.

In manufacturing tubular heat exchangers, a plurality of holes must be formed in each of the headers to receive the heat exchange tubes. Because forming these holes structurally weaken the header, it is useful to retain the metal moved from the hole area and form a flange around the hole as described in U.S. Pat. No. 3,689,972. Unfortunately, forming the hole can produce warping of the header or uneven hole edges. Either of these defects reduces the accuracy of the hole curvature which reduces the seal around the hole.

Another option is to construct the heat exchange header with a dome between the heat exchange tube connector holes. Such a construction is shown in U.S. Pat. No. 4,615,385. The use of a dome, however, can lead to uneven flow of the heat exchange fluid around the heat exchange tubes and between the fins. The domed surface between the header surface and the first row of fins exhibits a greater cross sectional area than other passages through the fins. This excess area provides a path of lower resistance to fluid flow. As a result, heat exchange fluid tends to flow through these larger spaces rather than through the passages between fins. This flow pattern reduces the effectiveness of the heat exchanger.

Additionally, the shape of the passage between the header, the fin, and the heat exchange tube exhibits a configuration that promotes the retention of water or other liquids. The curving surface of the header meets the tube in a narrowing passage that ends in a point. Water is held in that narrowing passage by capillary action thereby accelerating exterior corrosion of both the header and the heat exchange tubes. This relationship is illustrated in the attached FIG. 1.

In FIG. 1, annular depression 7 is bounded by the exterior of heat exchange tube 2, the lower surface of serpentine fins 4, and the exterior surface of header dome 11. Each side of dome 11 will form an annular depression 7.

When used for heat exchange with air, flowing air tends to pass through depression 7 rather than gaps 41 because the flow resistance through gaps 41 is greater than that of depression 7. Therefore, more air flows through depression 7 and at a higher velocity than the air passing through gaps 41. This is not the flow pattern for which heat exchangers are optimized, and the efficiency of heat-exchanging is less than it could be.

When the heat exchanger is used for heating a relatively cooler air, condensed water 42 from the warmer air accumulates in depression 7 due to capillary action between tube 2 and dome 11. If water accumulates in depression 7 for long enough, corrosion begins to weaken both header 1 and tube 2. Accordingly, the air must be dried before contact with the heat exchanger to minimize condensation. This extra equipment reduces the cost efficiencies associated with the heat exchange processes.

It would be desirable to have a way to form heat exchange tube connector holes without introducing dimensional inaccuracies in the hoe shape or warping the header.

It would also be desirable to have a way of reducing or eliminating the excess cross sectional area differences between the header and the cooling fins without adversely affecting the structural integrity of the header or the seal between the header and the heat exchange tubes.

It would further be desirable to reduce the excess area without harming the hermetic seal between the header and the heat exchange tubes.

SUMMARY OF THE INVENTION

It is an object of the invention to provide a method for forming connection holes in a heat exchange header without warping or dimensional inaccuracies.

It is an object of this invention to provide a method for making a heat exchanger that facilitates the flow of air between heat exchange fins rather than through areas that reduce the effectiveness of the heat transfer mechanisms.

It is another object of this invention to provide a method for making a heat exchanger with reduced tendencies toward corrosion of the headers and tubes.

In accordance with these and other objects which will become apparent from the description contained herein, heat exchangers according to this invention comprise a plurality of heat exchange tubes connecting a first and second header. A plurality of fins fixedly positioned around or between the heat exchange tubes over the distance between headers facilitates the transfer of heat between the fluid flowing in the tubes and the fluid flowing over the tubes.

The headers are connected to the heat exchange tubes through tapered, elongated holes which have been formed into the header by pressing. When the tube is inserted into the elongated hole, the taper of the hole exhibits an annular depression around the tube. It is this depression which forms the excess area and the curvature which can accumulate condensed moisture. To eliminate these problems, the connection is filled in with a sealing material to a height sufficient to reduce or eliminate a depression volume. Preferred sealing materials include solder or brazing metal.

The invention further relates to a pressing method for manufacturing a heat exchanger with headers traversed by heat exchange tubes having flat tubes exhibiting a flattened oval cross section. The method for forming the elongated holes comprises: (1) inserting a core bar into the header; (2) pressing a portion of the outer wall of the header with a pressing punch to form a depressed, elongated area having tapered edges on the header; (3) pulling out the core bar from the header; and (4) forming elongated holes in the depressed elongated area with a cutting punch. Heat exchanger tubes are then positioned in the elongated holes and brazed to a height sufficient to compensate for the tapered surface surrounding the tube connection The heat exchanger and its method for manufacture result in an efficient device. The header does not become warped, the connector holes are dimensionally accurate, and the flow patterns are efficient. Furthermore, the exchangers do not exhibit capillary surfaces around the header to accelerate header and/or tube corrosion.

Further objects and features of the invention will be understood from the following detailed description of the preferred embodiments and with reference to the attached drawings.

DETAILED DESCRIPTION OF THE DRAWINGS

Figure 1:
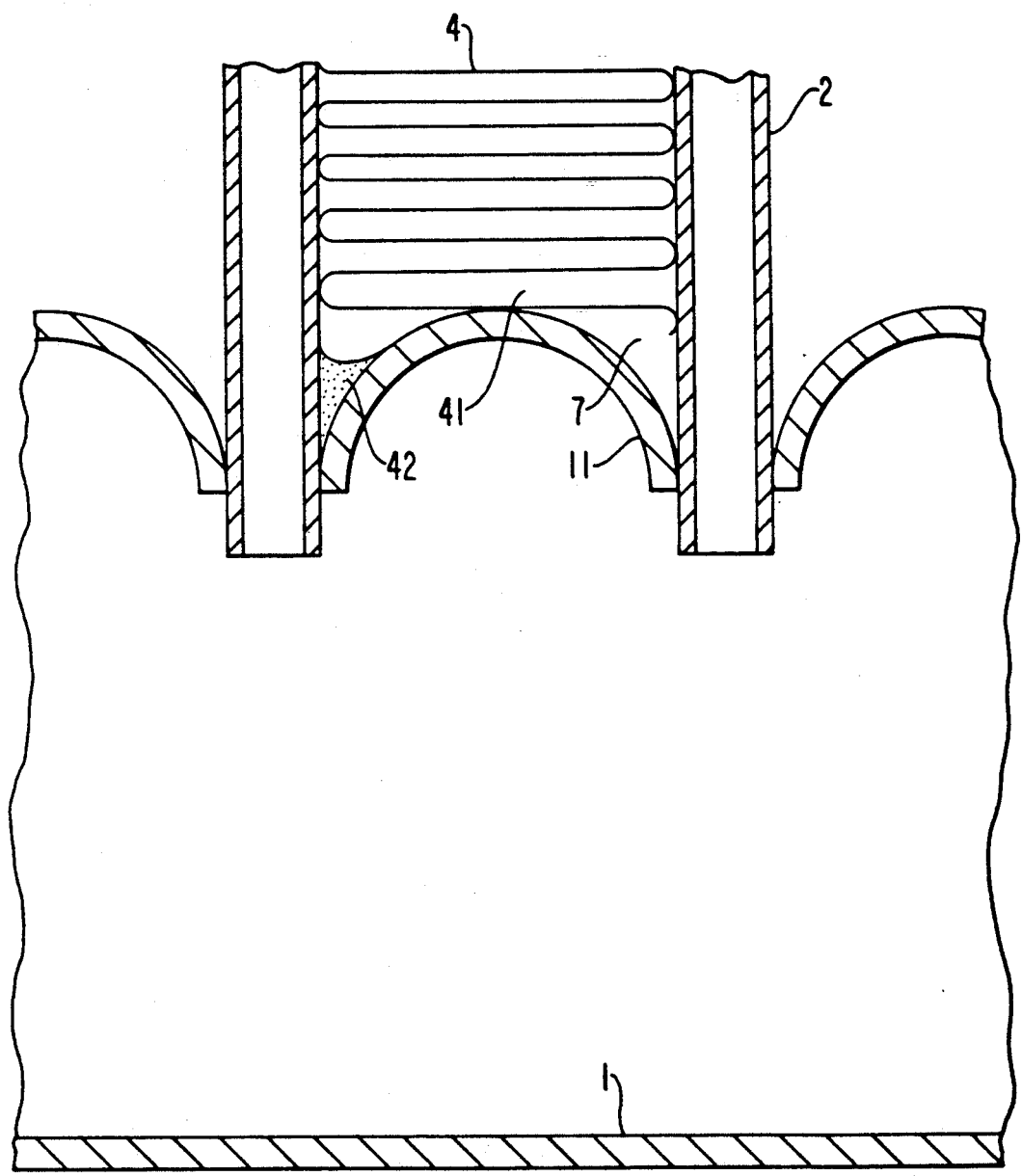
FIG. 1 is a cross-sectional view of showing a typical connection between a header and a pair of heat exchange tubes with a serpentine fin between the tubes.

In the drawings, similar structural elements bear the same reference numeral for convenient comparison.

Figure 2:
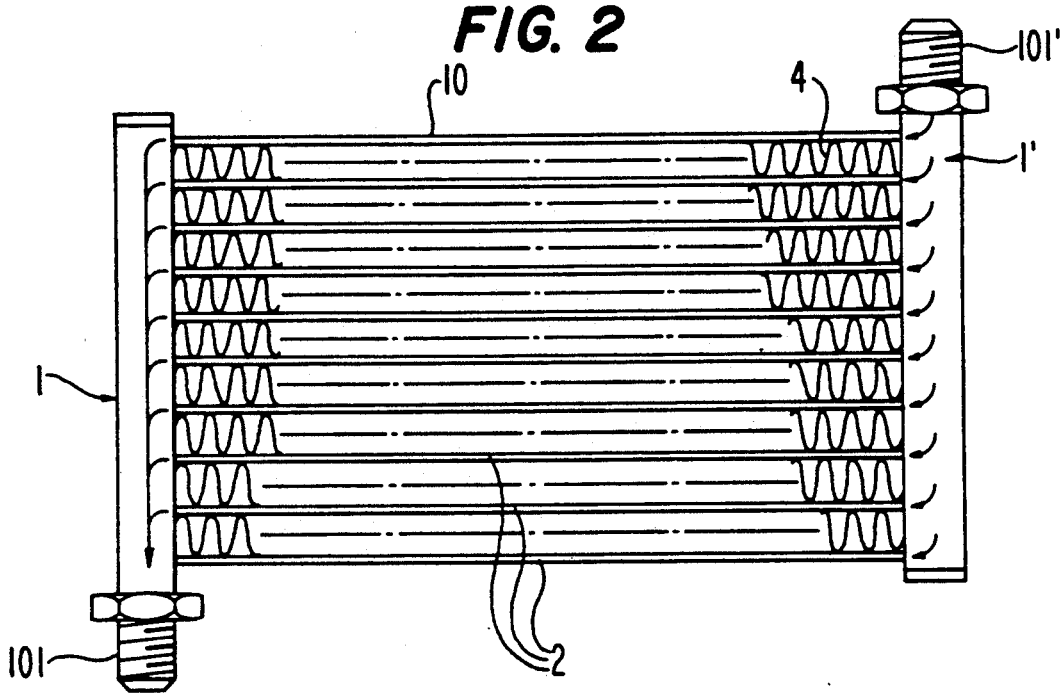
FIG. 2 is a front view of a heat exchanger having two headers interconnected by a plurality of heat exchange tubes having serpentine fins disposed between tubes and traversing the distance between headers in accordance with one embodiment of this invention.

A heat exchanger in accordance with an embodiment of this invention is shown in FIG. 2. Heat exchanger 10 includes first header 1 and 1' disposed in parallel at a distance traversed by a plurality of heat exchange tubes 2. Tubes 2 are shown in this embodiment as parallel to each other and are perpendicular to headers 1 and 1'.

A plurality of serpentine fins 4 are disposed between tubes 2 over the entire distance between headers 1 and 1'. If desired, other conventional fin configurations can be used to increase the transfer surface area. A few examples of such configurations include fins that radiate uniformly away from tubes 2 in a direction that is perpendicular to the tube surface rather than the angled direction of the exemplified serpentine fins.

Union joints 101 and 101' are formed on header pipes 1 and 1', respectively, for removing and introducing fluid into tubes 2 for heat exchange. Union joints 101 and 101' may terminate in a threaded connection, as shown, or may exhibit any form of connection suitable for the intended application.

Heat exchanger 10 may be sized and configured for use in the engine compartment of an automobile or it may serve as one portion of an automotive air conditioning circuit. When used in an automobile, the fluid inside tubes 2 will be some form of liquid engine coolant that releases heat or a vaporous refrigerant that absorbs heat. Air will pass over tubes 2 and fins 4 in either use.

Figure 3:
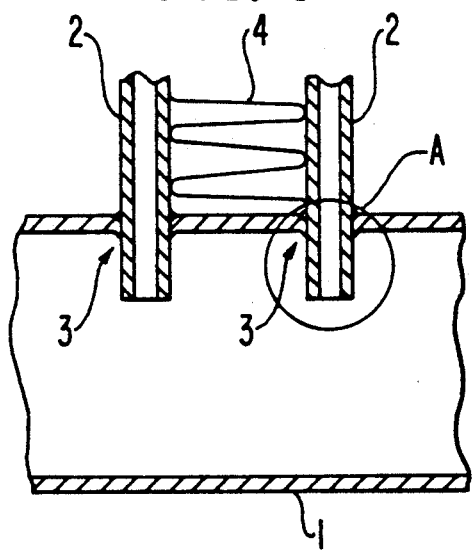
FIG. 3 is a cross-sectional view of showing a tube/headers connection for the heat exchanger shown in FIG. 2.
Figure 4:
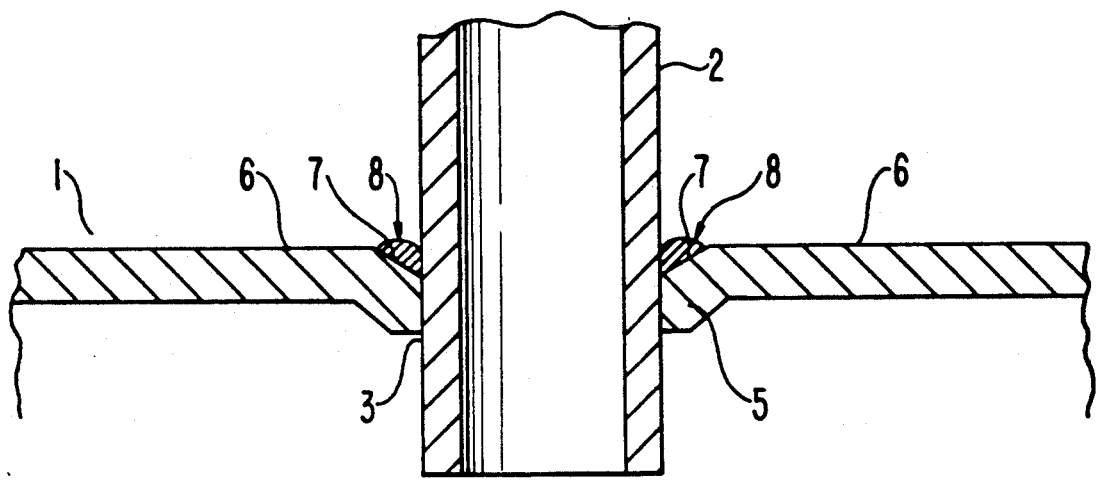
FIG. 4 is an enlarged view of the area defined by circle A in FIG. 3.

The header/tube connection for heat exchangers according to the invention are illustrated in FIGS. 3 and 4. In one side of header 1 are formed a plurality of elongated holes 3 through which tubes 2 extend. Preferably, header 1 is a regular, right cylinder with a continuous radius of curvature over the entire length of header 1 which does not exhibit domed surfaces between adjacent elongated holes 3 as in U.S. Pat. No. 4,651,385.

Figure 3A:
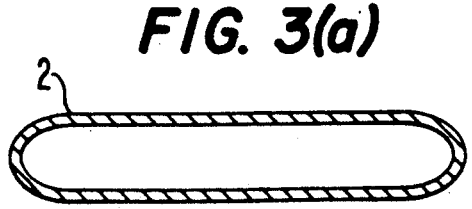
FIG. 3a depicts a heat exchange tube having a flattened oval cross sectional shape.

In addition, tubes 2 preferably exhibit a flattened oval cross section of the type depicted in FIG. 3a. The particular dimensions and thickness of tubes 2 will depend on the application intended for the heat exchanger.

The outside dimension of tube 2 is desirably sufficient to form a slightly loose or light friction fit with the inside dimensions of elongated hole 3. Such fits are desirable for easy assembly of the heat exchanger with a low risk that brazing or soldering material will leak into header 1. To achieve these fits, the inner diameter of elongated holes 3 is slightly larger than or slightly less than the outer diameter of tubes 2.

The inner surfaces of elongated holes 3 are formed to have tapered lip 5. Each tapered lip 5 of elongated holes 3 projects from the outer surface of header 1 toward the header interior (i.e. the radius of the right cylinder) and serves to guide the ends of tubes 2 during insertion into elongated holes 3. The particular angle of tapered lip 5 is dependent on the strength of the material making up header 1 and tubes 2. For many applications with typical materials, tapered lip 5 will exhibit an angle of declination relative to the outer surface of header 1 that is within a range from about 30° to less than about 90°, preferably within a range from about 40° to about 60°. The most preferred angle for the taper of lip 5 is about 45°.

The precise dimensions of the various elements in the inventive heat exchangers will be directly related to the specific application of the heat exchanger. Accordingly, no effort is made in this disclosure to try to define size ranges for the various elements making up the assembled heat exchanger. It is well within the existing skill for one in this art to determine appropriate sizes for the heat exchanger elements.

As depicted in more detail in FIG. 4, brazing or soldering material is deposited in annular depression 7 to fill out the annular depression 7 caused by the tapering configuration of elongated hole 3 in the surface of header 1 around tube 2. Brazing materials are melted and flow into annular depression 7 thereby sealing the outer surface of tubes 2 and the inner surface of elongated holes 3 against the passage of liquid, vapor, or gas.

With the brazing material filling in depressions 7, corrugated fins 4 can be distributed between tubes 2 without having a bypass space of lower flow resistance around the connections between tubes 2 and header pipes 1.

The brazing or solder fill thereby improves the efficiency of heat exchanging since the air is forced to pass efficiently through gaps 41 (FIG. 1) between corrugated fins 4. The brazing or soldering material also eliminates the collection of condensate liquids in annular depression 7 because the capillary effects are no longer present between header 1 and tube 2.

Figure 5A:
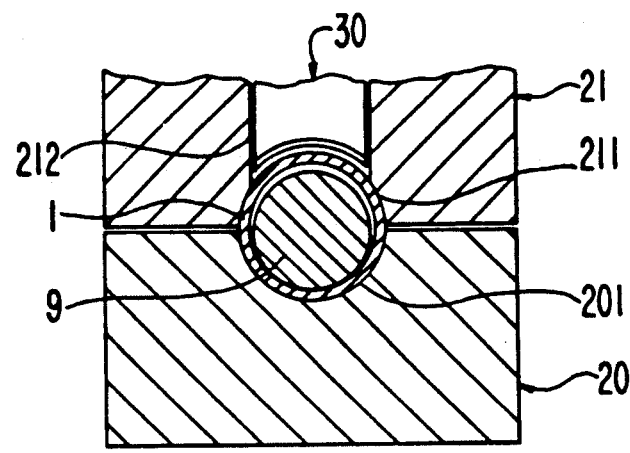
FIGS. 5(a)–(c) are sectional views showing a portion of the sequence of events for forming the tapered, elongated holes in a header. Illustrated is the pressing step which forms the tapered depression that is later punched out to become a tube connection opening.
Figure 5B:
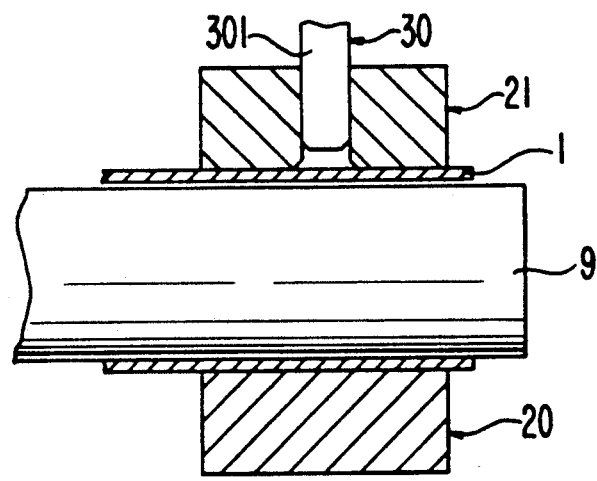
Figure 5C:
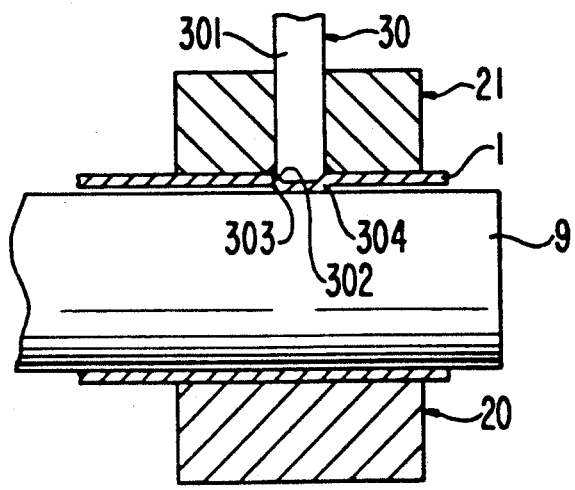

FIGS. 5(a)–(c) illustrate the formation of an elongated depression with walls that form a frustoconical taper. When the center portion of this depression is removed to form elongated holes 3, the frustoconically tapered walls form annular depression 7 and tapered lip 5.

As depicted, core bar 9 having a diameter slightly less than the inner diameter of header 1 is first inserted into the interior of header pipe 1. Header 1 is mounted in depression 201 of lower die 20 provided in a press (not shown) so the lower portion of header 1 can be securely held therein. The upper portion of header 1 is securely held by curved guide surfaces 211 of punch guide 21 at the opposite side of depression 201. When secured, pressing punch 30 slides downwardly along the inner surface of hole 212 formed vertically through punch guide 21.

The outer wall of header 1 is pressed by punch face 301 of pressing punch 30. This pressing causes the surface of header 1 to form a depression having the shape of punch face 301 to a depth corresponding to the diameter difference between core bar 9 and header 1. The shape of curved guide surfaces 211 are designed to hold the shape of header 1 without substantial deformation.

The pressed portion of header 1 is thinned by pressure from punch 30. Simultaneously, frustoconically tapered walls 304 and raised lip 303 are formed between punch face 301 and chamfered corners 302 of punch guide 21. Raised lip 303 provides a source of material that can deform and absorb the pressures associated with the removal of the thinned, center portion.

Figure 6A:
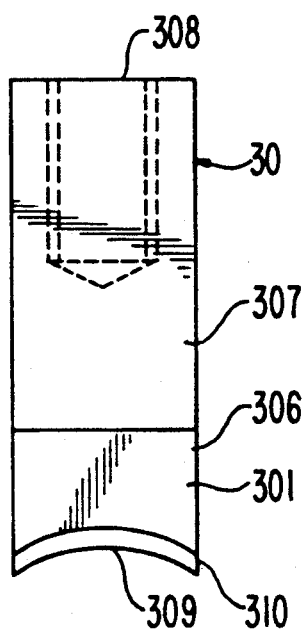
FIGS. 6(a)–(c) are front, side and isometric views of a pressing punch which can be used for the pressing step illustrated in FIGS. 5(a)–(c).
Figure 6B:
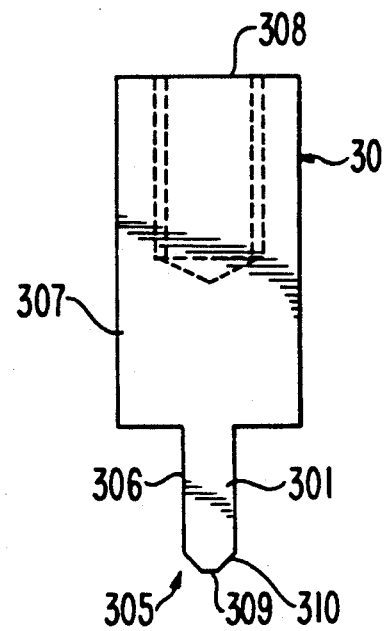
Figure 6C:
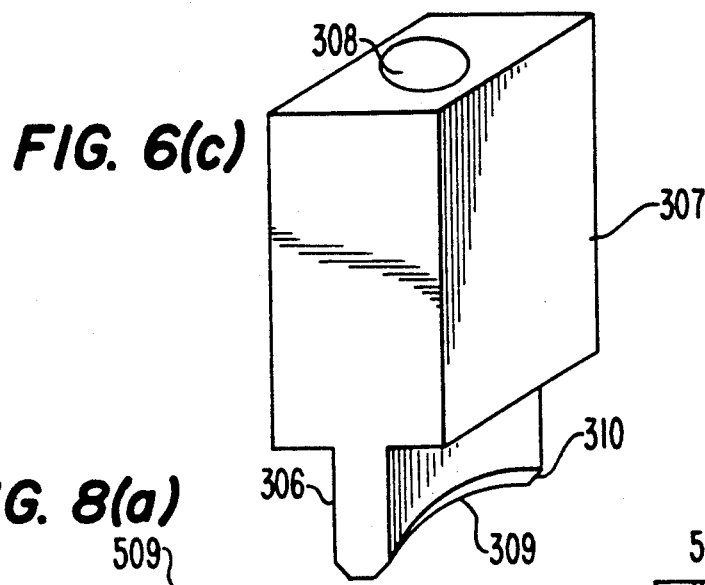

The shape of punch 30 is illustrated in more detail in FIGS. 6(a)–(c). Punch face 301 exhibits impact face 305 having a curved bottom face 309 and angled punch surfaces 310. Surfaces 310 have the angles that tapered edge 304 will exhibit after the pressing. (Extension 306 which is long enough to pass impact face 305 through punch guide 21.) Punch tool body 307 which contains a threaded boring 308. The angle of angled punch surfaces can have the same range of angles as tapered lip 5, i.e. about 30° to less than about 90°.

Figure 7A:
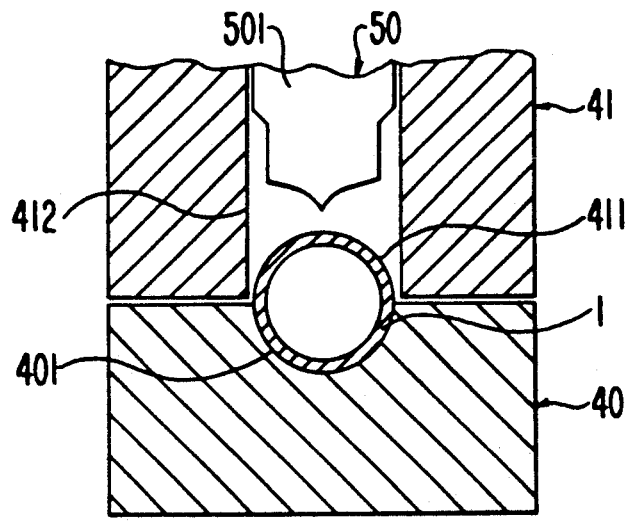
FIGS. 7(a)–(c) are sectional views illustrating the step of punching elongated holes into the header in the center portion of the area that was tapered and depressed with the pressing step of FIGS. 5(a)–(c). The tapered edges remain and only the center area is removed.
Figure 7B:
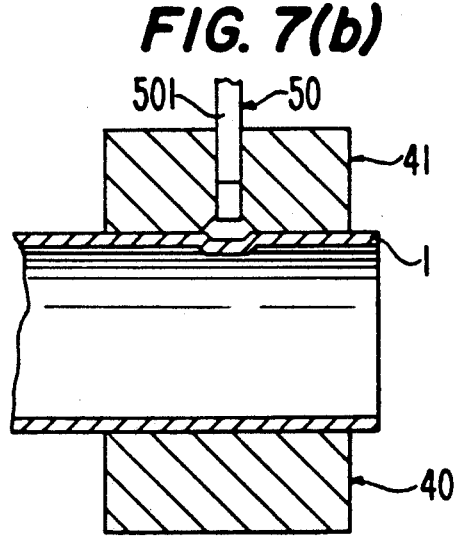
Figure 7C:
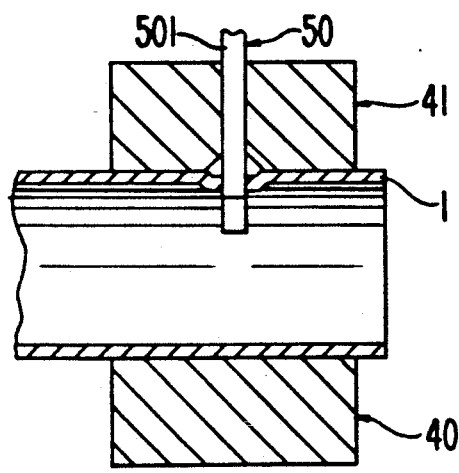

FIGS. 7(a)–(c) depict the removal sequence of the center portion of header 1 that was thinned in the pressing steps illustrated in FIGS. 5(a)–(c). Before the central portion is removed, core bar 9 is removed from the interior of header 1. Header 1 is re-mounted in depression 401 of lower die 40 provided in another press (not shown) to securely hold the lower portion of header 1. The upper portion of header 1 is securely held by curving walls 411 of punch guide 41 provided in the press at the opposite side of depression 401. In FIG. 7(a), the cross section is through curving walls 411 and, therefore, does not show the curvature which is designed to follow the external curvature of header 1.

When header 1 is secured, cutting punch 50 slides downwardly along the inner surface of hole 412 vertically formed through punch guide 41. The thinned central portion of header 1 is removed by contact with cutting face 501 of cutting punch 50. Thereafter, tubes 2 are each inserted into an elongated hole 3. Heat exchanger 10 is then brazed or soldered by conventional methods to a height sufficient to fill in annular depression 7 formed around tubes 2. Fins 4 are disposed over the entire length between the headers and between tubes 2.

Figure 8A:
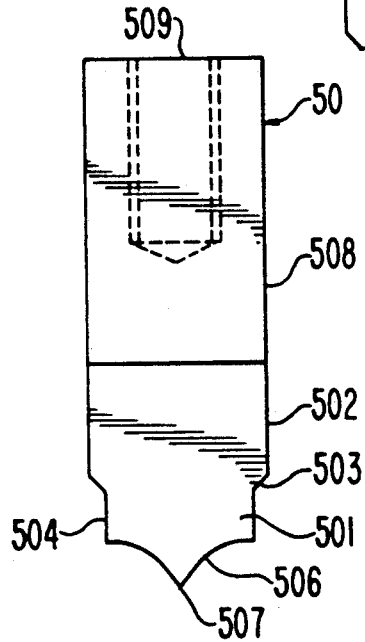
FIGS. 8(a)–(c) are front, side, and isometric views of a cutting punch useful for the punching step illustrated in FIGS. 7(a)–(c).
Figure 8B:
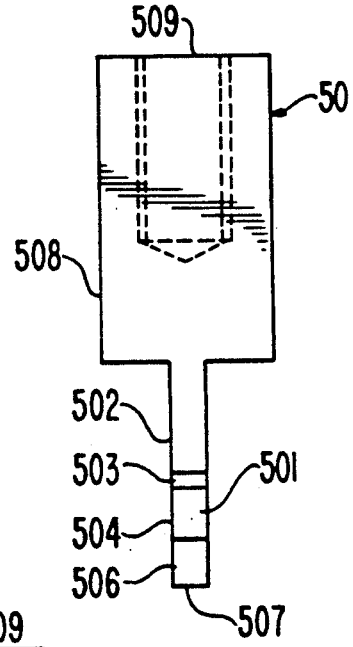
Figure 8C:
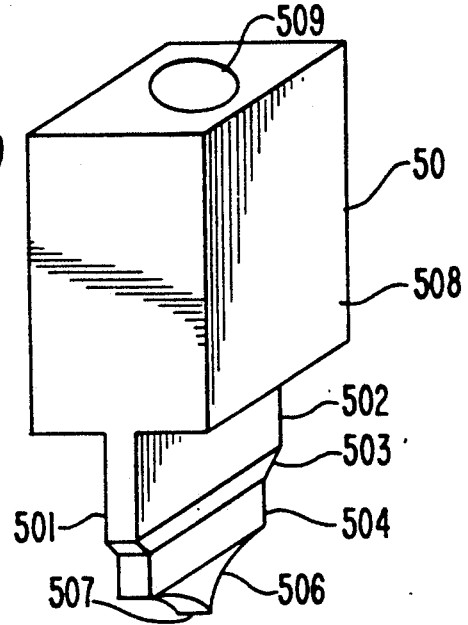

Cutting punch 50 has a sharp, tapered projection that is shown in more detail in FIGS. 8(a)–(c). The lower portion of punch 50 exhibits a tapered end 506 that terminates in a piercing point 507. Projection 504 has the shape and external dimensions of the desired dimensions for elongated opening 3. Tapered shoulder 503 forms tapered lip 5 around elongated hole 3. Extension portion 502 has a sufficient length to extend through press guide 41. Like punch 30, cutting punch 50 has a punch tool body 508 with a threaded boring 509.

This invention has been described in detail with the preferred embodiments. These embodiments, however, are merely examples of heat exchangers under the scope of the invention. The scope of the appended claims are not to be restricted to the details of these embodiments For example, the terms left, right, upper and lower were provided for the sake of convenience of description and are not intended to limit the invention. Those skilled in the art will readily understand from the description herein that variations and modifications can be easily made within the scope and spirit of the appended claims.

We claim:

1. A method for forming elongated holes in a header of a heat exchanger by a process comprising:
   inserting a core bar into the header;
   pressing a portion of the outer wall of the header with a pressing punch to form a depressed, elongated area having tapered edges on the header;
   removing the core bar from the header; and
   forming elongated holes by removing the center portion of the depressed elongated area with a cutting punch.

2. A method for manufacturing a heat exchanger having a first header connected to a second header by a plurality of flattened oval heat exchange tubes, said method comprising:
   forming a plurality of elongated holes on each of said headers by a pressing process comprising for each
   (a) inserting a core bar into one of said headers,
   (b) pressing a plurality of tapered depressions into one surface of said header;
   (c) removing said core bar from said header; and
   (d) punching out the central portion of the tapered depressions to form elongated holes surrounded by an annular depression;
   connecting the headers by inserting heat exchange tubes into elongated holes in the first header and the second header; and
   sealing the connections between the headers and the tubes and filling in the annular depressions around each tube with a sealing material.

3. A method according to claim 2 wherein the sealing step comprises soldering or brazing.

4. A method according to claim 2 wherein the forming step is on headers that are regular, right cylinders.